(12) United States Patent
Hasegawa et al.

(10) Patent No.: US 11,003,966 B2
(45) Date of Patent: May 11, 2021

(54) PRINTING APPARATUS AND MODULE

(71) Applicant: BROTHER KOGYO KABUSHIKI KAISHA, Nagoya (JP)

(72) Inventors: Wataru Hasegawa, Konan (JP); Koichi Tsugimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/796,265

(22) Filed: Feb. 20, 2020

(65) Prior Publication Data

US 2020/0272869 A1  Aug. 27, 2020

(30) Foreign Application Priority Data

Feb. 22, 2019 (JP) .............................. JP2019-030401

(51) Int. Cl.
*G06K 15/02* (2006.01)
(52) U.S. Cl.
CPC ................................ *G06K 15/1865* (2013.01)
(58) Field of Classification Search
None
See application file for complete search history.

(56) References Cited

U.S. PATENT DOCUMENTS

2008/0101706 A1* 5/2008 Maeda ..................... H04N 1/41
                                                        382/232
2017/0223210 A1   8/2017 Yamada

FOREIGN PATENT DOCUMENTS

JP           2017-134718 A      8/2017

* cited by examiner

*Primary Examiner* — Lennin R Rodriguezgonzalez
(74) *Attorney, Agent, or Firm* — Merchant & Gould P.C.

(57) ABSTRACT

In a printing apparatus, a controller is configured to: receive compressed image data created by compressing image data for pages; store the compressed image data into a memory; individually identify partial compressed data corresponding to the pages in the stored compressed image data; store one of the partial compressed data into the memory or stores information identifying each partial compressed data in the compressed image data, into the memory; execute a first creating processing for decompressing the one partial compressed data and creating print data for one page based on decompressed page data; and execute a first output processing for outputting the created print data. The controller repeats the first creating processing and the first output processing a number of times corresponding to the number of pages contained in the compressed image data. The printing apparatus performs printing based on the output print data.

16 Claims, 8 Drawing Sheets

PRINTING APPARATUS AND MODULE

CROSS REFERENCE TO RELATED APPLICATION

The present application claims priority from Japanese Patent Application No. 2019-030401, which was filed on Feb. 22, 2019, the disclosure of which is herein incorporated by reference in its entirety.

BACKGROUND

The following disclosure relates to a printing apparatus and a module configured to decompress compressed image data to perform printing.

There is known a printer that receives print data described in, e.g., a page description language (PDL), from a printer driver installed in a terminal device such as a personal computer and performs printing on a sheet based on the received print data.

The printer driver installed in the terminal device such as the personal computer uses a random-access memory (RAM) of a memory of the terminal device to convert image data for printing to print data in a form in which the printer can perform printing, and output the obtained print data.

SUMMARY

Printers configured to perform printing by receiving image data from a terminal device not via a printer driver are desired recently. That is, printers capable of receiving image data from the terminal device and performing printing by converting the received image data to print data have been desired.

Since RAMs used for converting data are expensive, however, the capacity of the RAM of the memory provided in the printer is generally less than that of the RAM of the memory of the terminal device such as a personal computer. The small capacity of the RAM makes it unable to convert image data to print data in the case where the data amount of the image data is large. The data amount of the image data is large in the case where the image data contains a plurality of pages.

Accordingly, an aspect of the disclosure relates to a printing apparatus and a module enabling printing for image data containing a plurality of pages.

In one aspect of the disclosure, a printing apparatus includes: a memory; and a controller configured to execute: a receiving processing in which the controller receives compressed image data that is data created by compressing image data for a plurality of pages; a first storing processing in which the controller stores the compressed image data into the memory; a first identifying processing in which the controller individually identifies a plurality of partial compressed data corresponding to the plurality of pages in the compressed image data stored in the memory; a second storing processing in which the controller stores one partial compressed data of the plurality of partial compressed data into the memory or stores information identifying each of the plurality of partial compressed data in the compressed image data, into the memory; a first creating processing in which the controller decompresses the one partial compressed data of the plurality of partial compressed data and creates print data for one page based on decompressed page data that is data for one page obtained by decompressing the one partial compressed data; and a first output processing in which the controller outputs the created print data. The controller is configured to repeat the first creating processing and the first output processing a number of times corresponding to the number of pages contained in the compressed image data. The printing apparatus is configured to perform printing based on the print data output in the first output processing.

Another aspect of the disclosure relates to a module provided in a controller of a printing apparatus including a memory and the controller. The controller is configured to execute: a receiving processing in which the controller receives compressed image data that is data created by compressing image data for a plurality of pages; a first storing processing in which the controller stores the compressed image data into the memory; an identifying processing in which the controller individually identifies a plurality of partial compressed data corresponding to the plurality of pages in the compressed image data stored in the memory; a second storing processing in which the controller stores one partial compressed data of the plurality of partial compressed data into the memory or stores information identifying each of the plurality of partial compressed data in the compressed image data, into the memory; a creating processing in which the controller decompresses the one partial compressed data of the plurality of partial compressed data and creates print data for one page based on decompressed page data that is data for one page obtained by decompressing the one partial compressed data; and an output processing in which the controller outputs the created print data. The controller is configured to: repeat the creating processing and the output processing a number of times corresponding to the number of pages contained in the compressed image data; and execute the identifying processing.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described one embodiment by reference to the drawings. It is to be understood that the following embodiment is described only by way of example, and the disclosure may be otherwise embodied with various modifications without departing from the scope and spirit of the disclosure. For example, the order of processings which will be described below may be changed without departing from the scope and spirit of the disclosure.

Figure 1A:
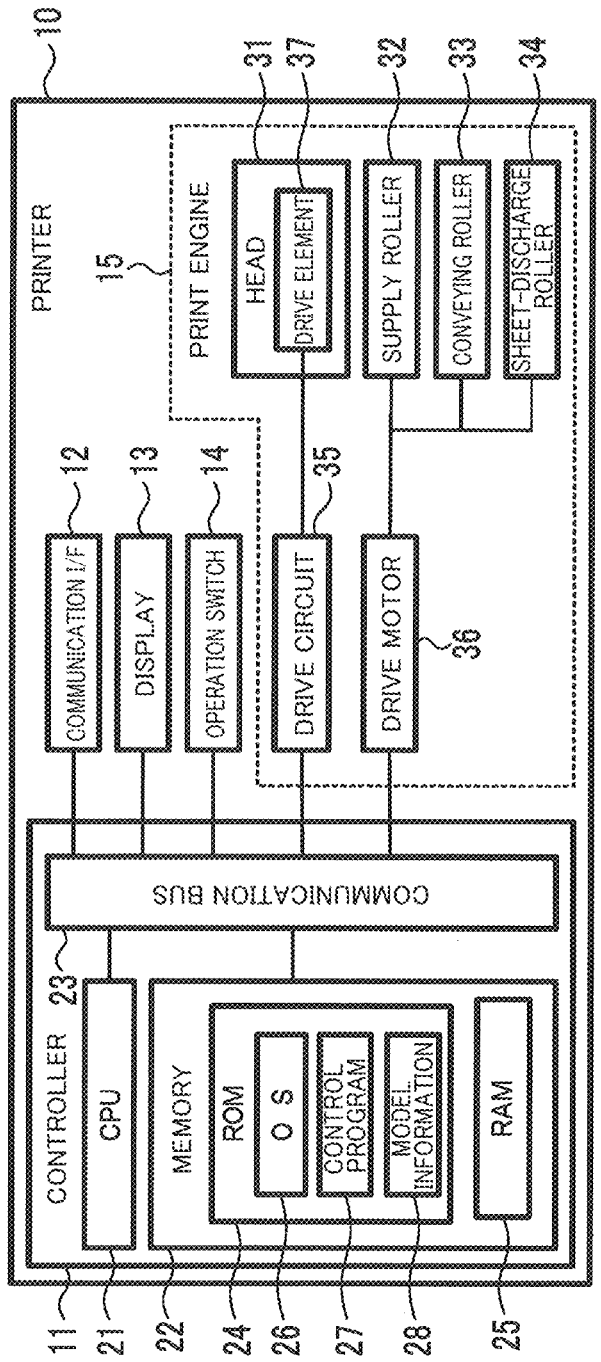
FIG. 1A is a view of a configuration of a printer.

There will be described a printer 10 according to the present embodiment with reference to FIGS. 1A and 1B. The printer 10 is capable of performing printing by receiving print data created by a printer driver installed in an information processing device such as a personal computer and capable of performing printing by receiving compressed image data. That is, the printer 10 is capable of receiving a print instruction not only from the information processing device installed with the printer driver but also from an information processing device not installed with the printer driver.

The printer 10 may be any of (i) an ink-jet printer configured to perform printing on a sheet by ejecting ink droplets onto the sheet, (ii) a laser printer configured to perform printing by pressing toner attached to a drum, against the sheet, and (iii) a thermal printer configured to perform printing on a sheet with film ink. That is, the printer 10 may perform printing on the sheet in any method. In the present embodiment, the printer 10 is the inkjet printer.

The printer 10 includes a controller 11, a communication interface 12, a display 13, an operation switch 14, and a print engine 15.

The communication interface 12 is connected to a communication network, not illustrated. The communication network is connected to the information processing device. That is, the communication interface 12 is connected to the information processing device over the communication network. Examples of the communication network include a universal-serial-bus (USB) cable, a wired local-area network (LAN), a wireless LAN, a wide area network (WAN), and the Internet. That is, the communication network may of be any type of the communication network as long as the compressed image data is transmittable from the information processing device to the printer 10. It is noted that the printer 10 need not be connected to the communication network as long as a portable storage medium such as a USB memory is mountable on the printer 10, and the compressed image data is inputtable to the printer 10.

The display 13 includes: a display panel configured to display characters and figures; and a transparent film-like touch sensor superposed on the display panel. That is, the display 13 is what is called a touch screen. It is noted that the display 13 may include only the display panel.

The operation switch 14 is configured to receive operational inputs of a user. It is noted that the printer 10 may include only one of the operation switch 14 and the touch sensor of the display 13. Each of the operation switch 14 and the touch sensor of the display 13 is one example of a user interface.

The print engine 15 includes a sheet-supply tray, a head 31, a supply roller 32, a conveying roller 33, a sheet-discharge roller 34, a sheet-output tray, a drive circuit 35, and a drive motor 36. The drive motor 36 drives and rotates the supply roller 32, the conveying roller 33, and the sheet-discharge roller 34. The sheet placed on the sheet-supply tray is supplied from the sheet-supply tray by the supply roller 32 being rotated and is then conveyed by the conveying roller 33 being rotated. While the sheet is being conveyed by the conveying roller 33, the head 31 ejects ink droplets to print an image on the sheet. That is, the print engine 15 conveys the sheet, performs printing on the conveyed sheet, and discharges the printed sheet to the sheet-output tray.

The head 31 includes drive elements 37 each configured to eject ink droplets. The drive element 37 is a piezoelectric element or a heater, for example. When a direct-current voltage is applied to the piezoelectric element, the piezoelectric element is deformed to eject the ink droplet. When a direct-current voltage is applied to the heater, the heater heats ink to cause bumping of the ink to eject the ink droplet.

The drive circuit 35 is configured to drive the drive elements 37. The drive circuit 35 selectively applies the direct-current voltage to one or ones of the drive elements 37 at the timing and a voltage value related to input print data. The print data is input to the drive circuit 35 by the controller 11.

The controller 11 includes: a central processing unit (CPU) 21; a memory 22 configured to store programs, information, and data; and a communication bus 23. The CPU 21 is one example of a computer.

The controller 11, for example, is constituted by a pattern circuit board and electronic components mounted on the pattern circuit board, such as microcomputers, various integrated circuits (ICs), capacitors, and diodes.

The CPU 21 and the memory 22 are connected to the communication bus 23. The CPU 21 executes an operating system (OS) 26 and a control program 27, which will be described below, stored in the memory 22. The OS 26 and the control program 27 executable by the CPU 21 read data and information from the memory 22 or write data and information into the memory 22. These operations will be described later in detail.

The communication bus 23 is connected to the communication interface 12, the display 13, the operation switch 14, and the drive motor 36 and the drive circuit 35 of the print engine 15. That is, the CPU 21 that executes the OS 26 and the control program 27 which will be described below is capable of: receiving information and data from the information processing device via the communication interface 12; displaying characters and images on the display 13; receiving user's instruction via the touch sensor of the display 13 and/or the operation switch 14; and inputting information and data to the drive motor 36 and the drive circuit 35 of the print engine 15.

The memory 22 includes a read-only memory (ROM) 24 and a random-access memory (RAM) 25. In addition to the ROM 24 and the RAM 25, the memory 22 may include an electrically erasable programmable ROM (EEPROM), a hard disk drive (HDD), a portable storage medium such as a USB memory, and a buffer of the CPU 21.

The memory 22 may be a storage medium readable by the computer. The storage medium readable by the computer is a non-transitory medium. In addition to the above-described examples, examples of the non-transitory medium include storage media such as a CD-ROM and a DVD-ROM. The non-transitory medium is also a tangible medium. An electric signal that transfers a program downloaded from, e.g., a server on the Internet is a signal medium readable by the computer as one kind of the medium readable by the computer but is not included in the non-transitory storage medium readable by the computer.

The ROM 24 stores the OS 26 and the control program 27.

The ROM 24 stores model information 28 indicating the specifications of the printer 10. The model information 28, for example, includes: the model name of the printer 10; information indicating the sizes of sheets usable for printing of the printer 10; information indicating that the printer 10 is capable of performing color printing; information indicating that the printer 10 is capable of performing duplex printing; and information indicating the orientation of the sheet to be conveyed. In the case where a sheet of the A4 size is conveyed, examples of the information indicating the orientation of the sheet to be conveyed include: information indicating sheet supply in a state in which the longitudinal direction of the sheet coincides with the conveying direction; and information indicating sheet supply in a state in which the widthwise direction of the sheet coincides with the conveying direction. The model information 28 is stored in the ROM 24 as management-information-base (MIB) information, for example. It is noted that the model information 28 may be stored in the EEPROM.

The RAM 25 is to be used for execution of the OS 26 and the control program 27 and for execution of processings for creating the print data based on the compressed image data. These operations will be described later in detail.

The control program 27 is for receiving the compressed image data, converting the received compressed image data to the print data, outputting the print data to the drive circuit 35 and the drive motor 36, and causing the print engine 15 to perform printing.

Figure 1B:
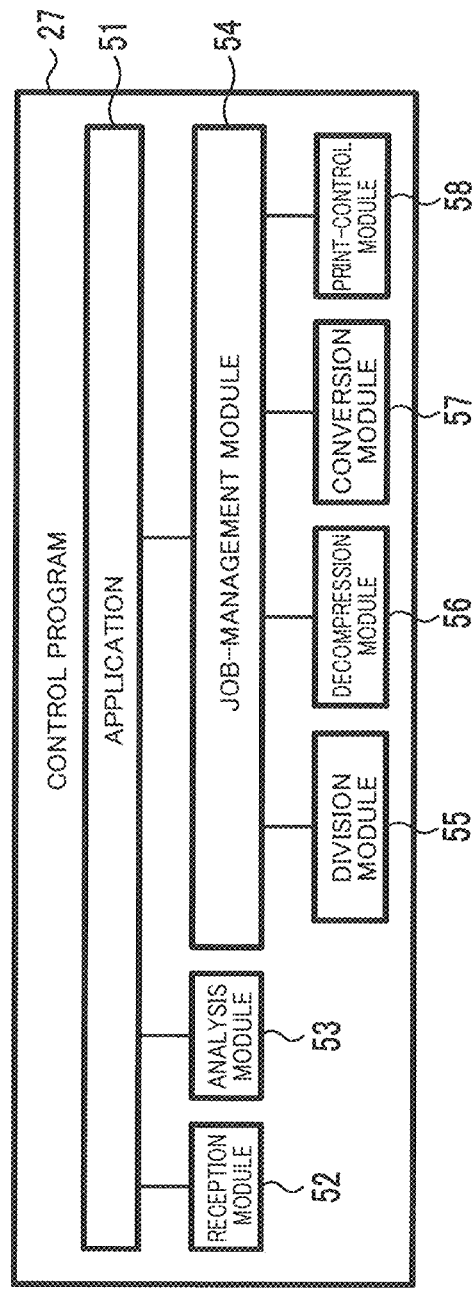
FIG. 1B is a view of a configuration of a control program.

As illustrated in FIG. 1B, the control program 27 includes a plurality of modules and an application 51 that is a protocol layer higher than the plurality of modules. The modules include a reception module 52, an analysis module 53, and a job-management module 54. Modules lower than the job-management module 54 include a division module 55, a decompression module 56, a conversion module 57, and a print-control module 58. In the following description, the reception module 52, the analysis module 53, the job-management module 54, the division module 55, the decompression module 56, the conversion module 57, and the print-control module 58 may be referred to as "the reception module 52 and so on". The division module 55, the decompression module 56, the conversion module 57, and the print-control module 58 may be referred to as "the division module 55 and so on".

The application 51 and the reception module 52 and so on are executed in pseudo-parallel. That is, the application 51 and the reception module 52 and so on are executed as multitasking processings.

The reception module 52 executes a receiving processing for receiving the compressed image data (FIG. 5) that is data obtained by compressing image data. The reception module 52 receives the compressed image data from the information processing device via the communication interface 12 or receives the compressed image data from, e.g., the USB memory mounted on the printer 10. The reception module 52 stores the received compressed image data into a specific storage area of the RAM 25 which is designated by the application 51.

The analysis module 53 analyzes the compressed image data stored in the memory 22 by the reception module 52 to register a job and a page job. When the compressed image data is received by the reception module 52, the analysis module 53 registers the print job with the job-management module 54 which will be described below. The analysis module 53 executes an analysis process (FIG. 3) for finding a page contained in the compressed image data without decompressing the compressed image data. When the page is found, the analysis module 53 registers the page job with the job-management module 54. These operations will be described later in detail. The analysis module 53 is one example of a module.

The job-management module 54 causes the division module 55 and so on to execute processings which will be described below to execute a processing for outputting the print data to the print engine 15. That is, the job-management module 54 manages and processes the registered print job and page job.

The division module 55 creates partial compressed data (FIG. 5) based on the compressed image data. The partial compressed data is data created by compressing image data for one page without decompressing the compressed image data. Specifically, it is considered that data obtained by decompressing the compressed image data containing a plurality of pages cannot be processed due to the capacity of the RAM 25 of the memory 22, depending upon the number of pages and/or the resolution of the image represented by the data. The division module 55 creates partial compressed data for one page from the compressed image data without the decompression module 56, which will be described below, decompressing all the compressed image data.

The decompression module 56 creates decompressed page data by decompressing the partial compressed data created by the division module 55.

The conversion module 57 converts the decompressed page data created by the decompression module 56 to the print data. Examples of the conversion include rotation, color conversion, error diffusion, and quinary conversion.

The rotation is a processing of converting the orientation of an image represented by the decompressed page data by rotating the image by a rotation angle such as 90 degrees, 180 degrees, 270 degrees, and −90 degrees.

The color conversion is a processing of converting RGB (red, green, blue) color data containing the decompressed page data, to, e.g., BMCY color data based on which the print engine 15 can perform printing. BMCY represents black, magenta, cyan, and yellow.

The error diffusion is one of binary-conversion techniques and is conversion to be executed for improving the image quality.

The quinary conversion is conversion for creating, from the decompressed page data, a drive signal related to the voltage value of the direct-current voltage to be applied to the drive element 37. Examples of the voltage value include "small", "medium", "large", "extra-large", and "zero".

The print-control module 58 outputs the print data to the drive circuit 35 and the drive motor 36 to cause the print engine 15 to perform printing.

There will be next described, with reference to FIGS. 2-6, processings in which the control program 27 creates the print data from the compressed image data and outputs the created print data to cause the print engine 15 to perform printing. It is noted that the reception module 52, the analysis module 53, and the job-management module 54 execute processings described below in response to receiving instructions from the application 51.

In the present specification, there will be principally described processings to be executed by the CPU 21 according to commands described in the control program 27. That is, the processings such as determination (judgement), extraction, selection, calculation, determination, identification, obtainment, reception, control, and setting in the following description represent the processings to be executed by the CPU 21. The processings to be executed by the CPU 21 include control of hardware via a controller such as the OS 26. It is noted that obtainment is to be used as a concept not requiring a request. That is, the processing in which the CPU 21 receives data without a request is included in the concept that the CPU 21 obtains data. In the present specification, data is represented by a bit string readable by the computer. Data substantially identical in meaning but different in format are treated as the same data. Information is treated in the same manner. The processings such as instruction, response, and requirement are to be executed by communication of information indicating instruction, response, and requirement, for example. The terms such as instruction, response, and requirement may be described in meaning of information itself indicating instruction, response, and requirement, for example.

The processings to be executed by the CPU 21 according to the commands described in the control program 27 may be simply described. For example, the expression "the CPU 21 executes a processing according to the control program 27" may be hereinafter referred to as "the CPU 21 executes a processing", "the controller 11 executes a processing", or "the control program 27 executes a processing".

In the present specification, the processing in which the CPU 21 determines whether information A indicates that a condition B is satisfied may be conceptually referred to as "the processing in which the CPU 21 determines based on the information A whether the condition B is satisfied". Also, the processing in which the CPU 21 determines whether information A indicates that the condition B is satisfied or a condition C is satisfied may be conceptually referred to as "the processing in which the CPU 21 determines based on the information A whether the condition B is satisfied or the condition C is satisfied".

In the present specification, each of data and information is represented by a bit or a bit string that can be treated by the computer. The computer can treat data without consideration of meaning indicated by each bit. In contrast, operations of the computer change depending upon meaning indicated by each bit in information. Instruction is a control signal for prompting a destination device to perform the next operation. Instruction may contain information and may have a property of information.

Moreover, data is treated as the same data as long as the data is recognized to represent the same meaning, even in the case where the form (e.g., the text format, the binary format, and the flag format) of the data varies with computer. This applies to information. For example, information representing "two" may be kept as information in the text format "0x32" in the ASCII code in some computer and kept as information in the binary format "10" in the binary expression in another computer.

It should be understood that the above-described distinction between data and information is not strict, and an exceptional treatment is allowed. For example, data may be temporarily treated as information, and information may be temporarily treated as data. Data treated in some device may be treated as information in another device. Information may be taken out from data, and data may be taken out from information.

The term "when" or "in response to" in the present specification indicates that a processing described after the character string is to be executed, in the case where the condition described before the character string is satisfied. It is noted that the timing of execution of the processing at least needs to be a timing after the condition is satisfied and need not be a timing just after the condition is satisfied.

It is noted that the processing at S25 indicated by the broken line in FIG. 2 will be described later in description for a sixth modification.

Figure 2:
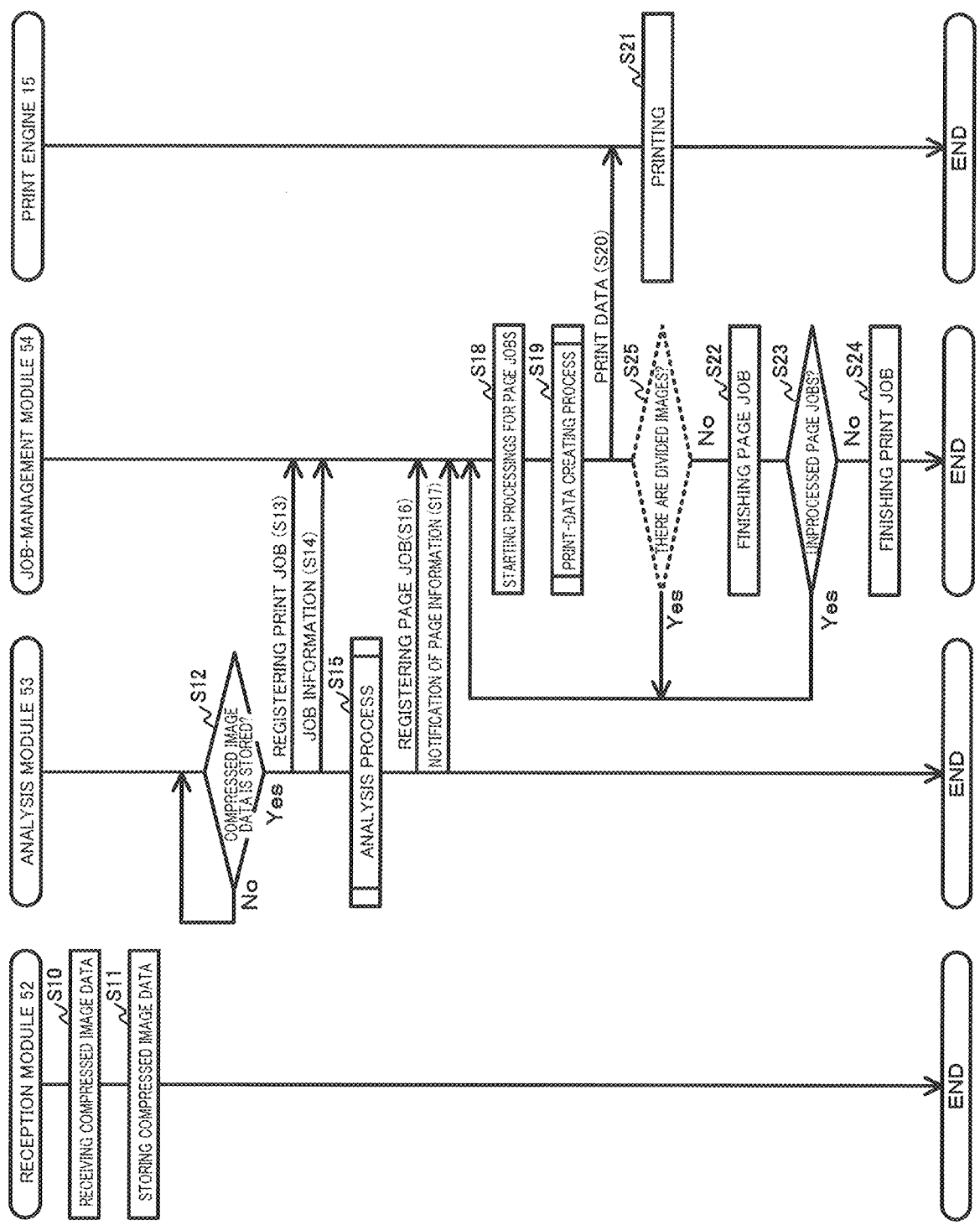
FIG. 2 is a view for explaining processings from creation to an output of print data according to the control program.

As illustrated in FIG. 2, the reception module 52 at S10 receives, from the information processing device, an input of the compressed image data (FIG. 6) containing document information, page header information, and compressed data. The processing at S10 is one example of the receiving processing.

The document information, the page header information, and the compressed data are a set of data. In the example illustrated in FIG. 5, the compressed image data contains the document information, first-page header information, compressed data for a first-page image, second-page header information, compressed data for a second-page image, third-page header information, and compressed data for a third-page image.

The document information is a command for determining the type of data, for example. The page header information contains print settings and a resolution. Examples of the print settings include: information indicating the size of the sheet such as the A4 size and the A5 size; information indicating the type of the sheet such as a plain paper and a glossy paper; information indicating a printing side such as simplex printing and duplex printing; and information indicating a printing color such as black and white printing and color printing. The resolution is information representing the number of pixels of the page in the height direction and the number of pixels of the page in the width direction. For example, the resolution is 400 (width)×400 (height) or 600 (width)×600 (height).

As illustrated in FIG. 2, the reception module 52 at S11 stores the received compressed image data into the RAM 25 of the memory 22. The processing at S11 is one example of a first storing processing.

The analysis module 53 at S12 determines whether the compressed image data is stored in the RAM 25. The analysis module 53, for example, monitors a predetermined area of the RAM 25 stored in the compressed image data (S12: No) to determine whether the compressed image data is stored in the RAM 25.

When the analysis module 53 determines that the compressed image data is stored in the RAM 25 (S12: Yes), the analysis module 53 at S13 registers a print job with the job-management module 54. The analysis module 53 reads and obtains the document information contained in the compressed image data. The analysis module 53 at S14 notifies the job-management module 54 of job information containing the print settings contained in the obtained document information.

The analysis module 53 at S15 executes the analysis process for obtaining information about the page contained in the compressed image data (hereinafter referred to as "page information"). The page information is required to register the page job with the job-management module 54. The analysis process at S15 is one example of a first identifying processing and an identifying processing.

The page information identifies a first page, a second page, a third page, and so on contained in the compressed image data. For example, the page information identifies unit data indicating the last pixel of each page, in a plurality of unit data in the compressed image data. In the case where a portion of the compressed image data from the first byte to 300th byte indicates the first page, a portion of the compressed image data from the 301st byte to 500th byte indicates the second page, and a portion of the compressed image data from the 501st byte to 800th byte indicates the third page, for example, each of "300", "500", and "800" is the page information. It is noted that the page information is not limited to the data size in the compressed image data such as "300", "500", and "800" and may be other information or data as long as the information or data identifies each page.

It is noted that the total number of pages and the above-described page information contained in the compressed image data are not contained in the document information contained in the compressed image data. The analysis module 53 obtains the page information in the analysis process without the need of keeping all the image data created by decompressing the entire compressed image data. That is, a RAM with such a large capacity that can store all the image data obtained by decompressing the entire compressed image data is not required. The analysis process will be described below in detail with reference to FIG. 3.

Figures 6A, 6B:
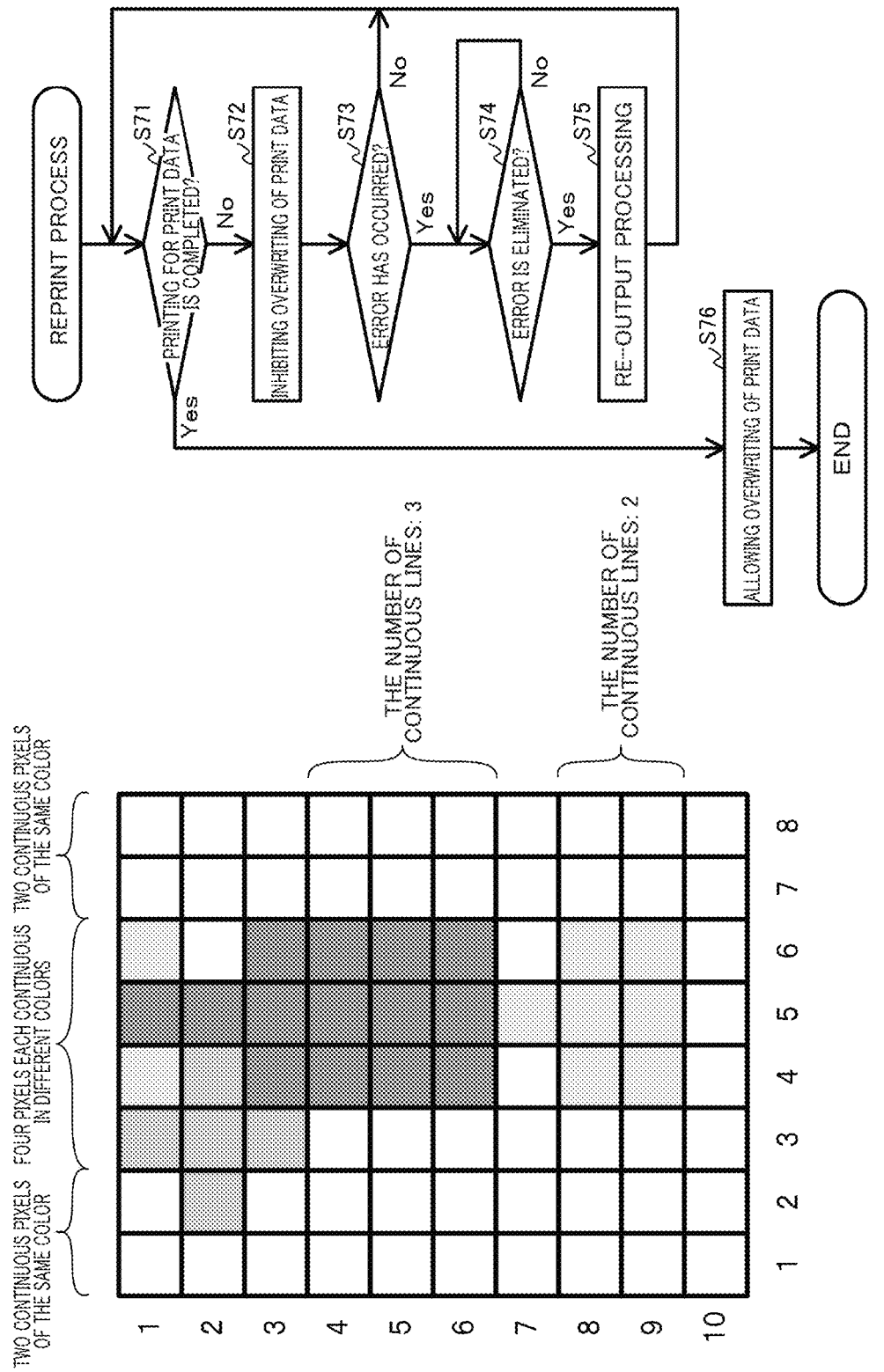
FIG. 6A is a view of pixels in an image.
FIG. 6B is a flowchart representing a reprint process.

In the following description, the analysis process will be described, taking, as an example, a case where the compressed image data representing a page containing an image illustrated in FIG. 6A is analyzed. The resolution of the image is 8 (width)×10 (height). That is, the number of pixels in the width direction is "8", and the number of pixels in the height direction is "10". Ten rows each constituted by eight pixels arranged in the width direction are arranged in the height direction. The rows may be hereinafter referred to respectively as "first row", "second row", "third row", "fourth row", "fifth row", "sixth row", "seventh row", "eighth row", "ninth row", and "tenth row" in the order from the upper side.

In the following description, there will be described a case where the image data is compressed image data which is compressed in the PackBits format. It is noted that the processings at S31 and S32 indicated by the broken lines in FIG. 3 will be described later in description for a second modification.

Figure 3:
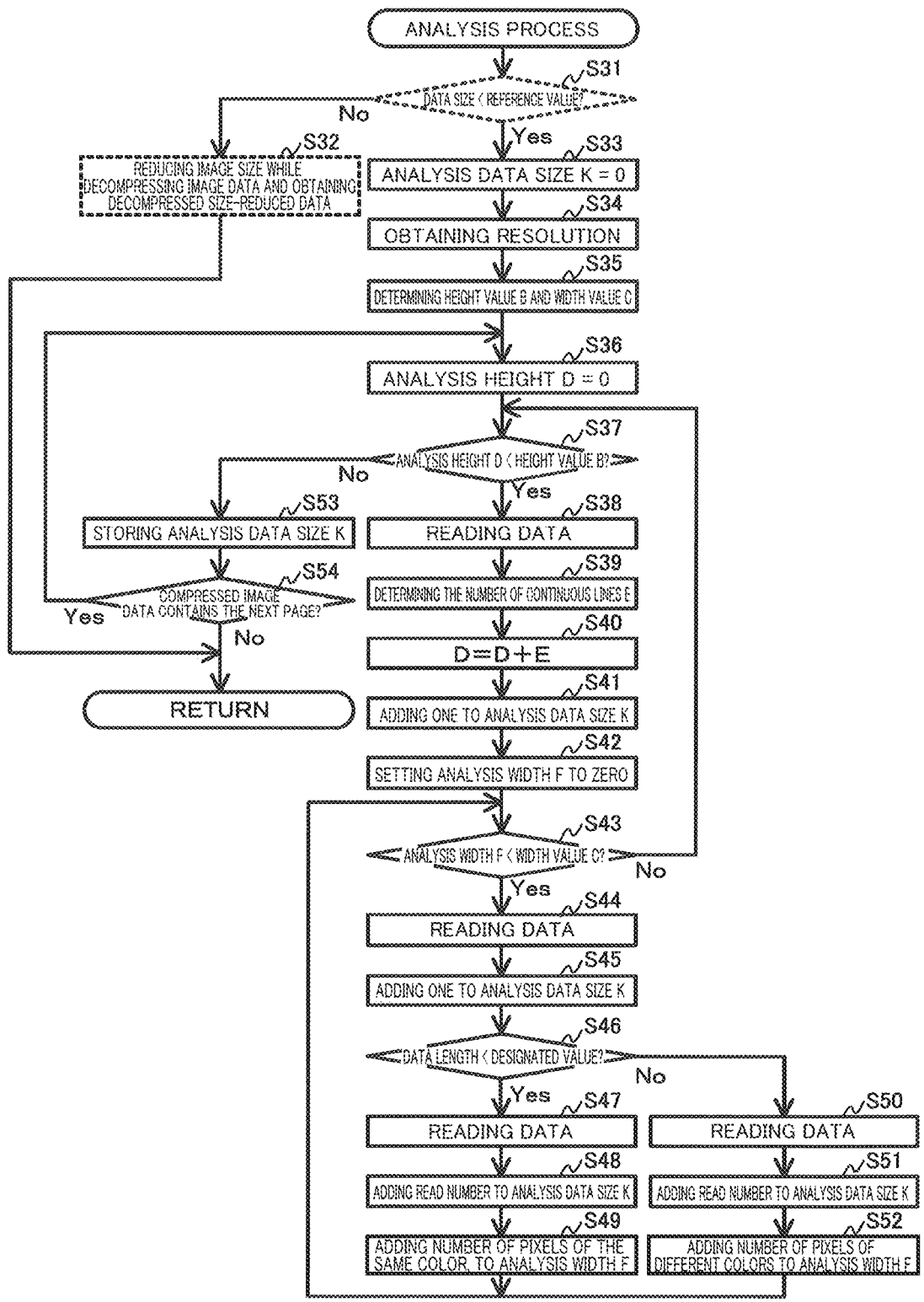
FIG. 3 is a flowchart representing an analysis process.

As illustrated in FIG. 3, the analysis module 53 at S33 sets an analysis data size K to an initial value. The analysis data size K indicates the number of unit data for which an analysis is completed after reading of the unit data.

The analysis module 53 at S34 obtains the document information by reading the compressed image data and obtains the resolution contained in the document information. The analysis module 53 at S35 determines a height value B and a width value C based on the obtained resolution. The height value B indicates the number of pixels in the height direction which is indicated by the resolution. The width value C indicates the number of pixels in the width direction which is indicated by the resolution. In the example illustrated in FIG. 6A, the height value B is ten, and the width value C is eight. The processing at S34 in which the analysis module 53 obtains the document information is one example of an obtaining processing. The height value B is one example of a first threshold value. The processing at S35 in which the analysis module 53 determines the height value B is one example of a threshold-value determining processing.

The analysis module 53 at S36 sets an analysis height D to zero as an initial value. The analysis height D indicates the number of pixels in the height direction which indicates the total number of pixels indicating the analysis data size K for which the analysis is completed. That is, the analysis height D is a value which represents the number of rows for which the analysis is completed in the page. The total number of pixels indicating the analysis data size K for which the analysis is completed is one example of a count value.

The analysis module 53 at S37 determines whether the analysis height D is less than the height value B. In the example illustrated in FIG. 6A, the analysis module 53 determines whether the analysis height D has reached ten as the height value B, in other words, the analysis module 53 determines whether the analysis is completed for the first to tenth rows. That is, the analysis module 53 at S37 determines whether the analysis for one page is completed.

The analysis module 53 starts analyzing the next and subsequent rows when the analysis module 53 at S37 determines that the analysis height D is less than the height value B (S37: Yes), that is, when the analysis module 53 determines that the analysis for one page is not completed.

Specifically, the analysis module 53 at S38 reads unit data having not been analyzed yet. The analysis module 53 at S39 determines the number of continuous lines E based on the read unit data. In the example illustrated in FIG. 6A, the fourth to sixth rows are the same as each other in the content of the pixels, and the eighth and ninth rows are the same as each other in the content of the pixels. The analysis module 53 determines the numbers of continuous lines E=1, E=2, and E=3.

The analysis module 53 at S40 adds the determined number of lines E to the analysis height D. For example, in the case where the number of continuous lines E is equal to three, "3" is added to the analysis height D. When the unit data is read, the analysis module 53 at S41 adds "1" to the analysis data size K.

The analysis module 53 at S42 sets an analysis width F to zero as an initial value. The analysis width F represents the number of pixels in the width direction which is indicated by the unit data being analyzed. The analysis module 53 at S43 determines whether the analysis width F is less than the width value C. That is, the analysis module 53 at S43 determines whether the pixel indicated by the unit data being analyzed has reached the pixel at the right end in FIG. 6A.

When the analysis width F is greater than or equal to the width value C (S43: No), the analysis module 53 executes processings at S37 and subsequent steps. When the analysis module 53 determines that the analysis width F is less than the width value C (S43: Yes), the analysis module 53 at S44 reads the unit data and obtains the data length of the read unit data. The data length indicates continuation of pixels of the same color and indicates continuation of pixels of different colors. When the unit data is read, the analysis module 53 at S45 adds one to the analysis data size K.

The analysis module 53 at S46 determines whether the data length obtained at S44 is less than a designated value. That is, the analysis module 53 at S46 determines whether the pixels of the same color continue, or the pixels of different colors continue. Specifically, in the case where the unit data is of eight bits, the analysis module 53 determines whether the data length is less than 128 as the designated value. The designated value is stored in the ROM 24 and the EEPROM of the memory 22 in advance.

When the analysis module 53 determines that the data length obtained at S44 is less than the designated value, and the pixels of the same color continue (S46: Yes), the analysis module 53 at S47 reads a number of the unit data which is related to the number of pixels of the same color which is indicated by the data length obtained at S44. The analysis module 53 at S48 adds the read number of the unit data to the analysis data size K. The analysis module 53 at S49 adds the number of pixels of the same color which is indicated by the data length obtained at S44, to the analysis width F.

When the analysis module 53 determines that the data length obtained at S44 is greater than or equal to the designated value, and the pixels of different colors continue (S46: No), the analysis module 53 at S50 reads a number of the unit data which is related to the number of pixels of different colors which is indicated by the data length obtained at S44. The analysis module 53 at S51 adds the read number of the unit data to the analysis data size K. The analysis module 53 at S52 adds the number of pixels of different colors which is indicated by the data length obtained at S44, to the analysis width F.

After the execution at the processings at S49 and S52, the analysis module 53 executes the processings at S43 and subsequent steps again.

When the analysis module 53 at S37 determines that the analysis height D is greater than or equal to the height value B, and the number of pixels indicated by the read unit data has reached the total number of pixels for one page (S37: No), the analysis module 53 at S53 stores the analysis data size K indicating the total number of the read unit data, into the RAM 25 or the EEPROM of the memory 22. In the example illustrated in FIG. 5, the analysis module 53 stores, into the memory 22, (a) a first analysis data size K that is the size of data to the unit data indicating the last pixel of the first page, (b) a second analysis data size K that is the size of data to the unit data indicating the last pixel of the second page, and (c) a third analysis data size K that is the size of data to the unit data indicating the last pixel of the third page. The processing at S53 in which the analysis data size K is stored into the memory 22 is one example of a second storing processing.

The analysis module 53 at S54 determines whether the compressed image data contains unit data having not been read. That is, the analysis module 53 at S54 determines whether the compressed image data contains the next page.

When the analysis module 53 determines that the compressed image data contains the next page (S54: Yes), the analysis module 53 executes the processings at S36 and subsequent steps again. When the analysis module 53 determines that the compressed image data does not contain the next page (S54: No), the analysis process ends.

As illustrated in FIG. 2, after the end of the analysis process (S15), the analysis module 53 at S16 registers, with the job-management module 54, a number of the page jobs which corresponds to the number of the found pages. It is noted that the analysis module 53 may register the page job with the job-management module 54 each time when a page is found in the analysis process.

The analysis module 53 at S17 notifies the job-management module 54 of the page information on the registered page jobs. The page information contains the analysis data size K stored at S53 in the analysis process, and so on.

When the page jobs are registered by the analysis module 53, the job-management module 54 at S18 stores print queues into the RAM 25 of the memory 22. That is, the job-management module 54 creates the print queues. The job-management module 54 at S18 starts processings for the print queues in the order of creation. That is, the job-management module 54 processes the registered page jobs in order. These processings will be described below in detail.

The job-management module 54 at S19 executes a print-data creating process for creating, based on the compressed image data, print data for one page such as the first page. The print-data creating process will be described in detail with reference to FIG. 4. It is noted that the case of creation of print data for the first page will be described by way of example. The processing at S70 indicated by the broken line in FIG. 4 will be described later in description for the sixth modification.

The job-management module 54 at S61 inputs a division instructing command to the division module 55. The division instructing command instructs the division module 55 to create partial compressed data for the first page by dividing the compressed image data stored in the RAM 25 of the memory 22 and to store the created partial compressed data for the first page into the RAM 25. The division instructing command is attached with (a) the first analysis data size K contained in the page information transmitted from the analysis module 53 at S17, and (b) area designating information for designating a storage area of the RAM 25.

Figure 5:
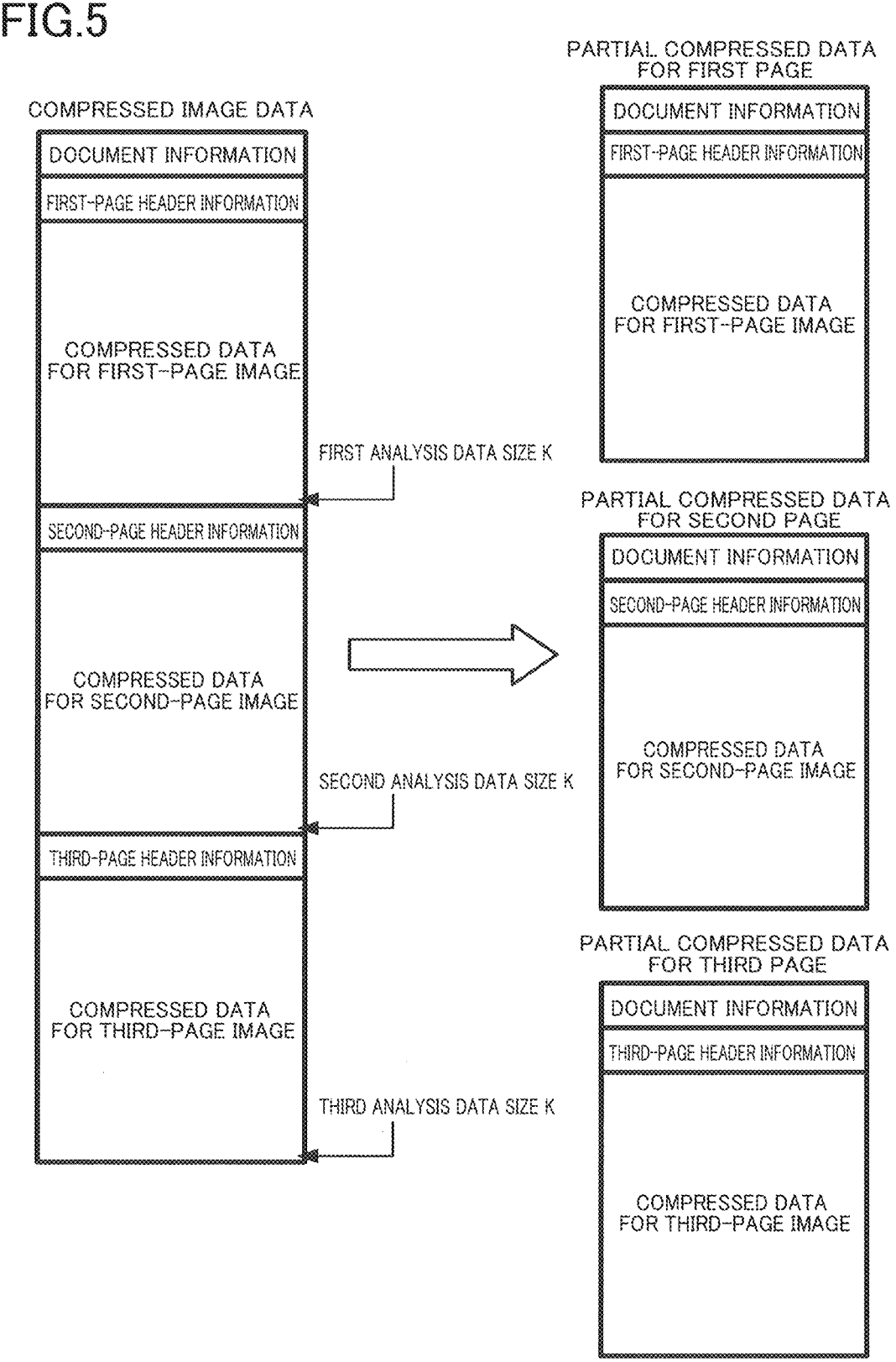
FIG. 5 is a view for explaining partial compressed data.

In response to receiving the division instructing command at S61, the division module 55 executes a division processing at S62. Specifically, the division module 55 reads the compressed image data from the RAM 25 of the memory 22. The division module 55 uses the first analysis data size K, as illustrated in FIG. 5, to divide the compressed image data at a position located between the compressed data for the first-page image and the second-page header information to create the partial compressed data for the first page and its remaining data. The division module 55 at S63 stores the created partial compressed data for the first page, into the storage area of the RAM 25 which is designated by the job-management module 54. The remaining data is deleted without being stored into the memory 22. That is, the division module 55 creates the partial compressed data for the first page, based on data located between the first-page header information and the second-page header information.

It is noted that, in the case where the job-management module 54 executes a page-job processing for the second page, for example, the job-management module 54 inputs, to the division module 55, a division instructing command attached with (a) the first analysis data size K and the second analysis data size K, and (b) area designating information for designating a storage area of the RAM 25. The division module 55 uses the first analysis data size K and the second analysis data size K, as illustrated in FIG. 5, to divide the compressed image data at a position located between the compressed data for the first-page image and the second-page header information and between the compressed data for the second-page image and the third-page header information and attach the document information to create partial compressed data for the second page and its remaining data. The job-management module 54 at S63 stores the created partial compressed data for the second page into the specific storage area of the RAM 25 of the memory 22. The remaining data is deleted without being stored into the memory 22. That is, the division module 55 creates the partial compressed data for the second page, based on data located between the second-page header information and the third-page header information.

In the case where the job-management module 54 executes a page-job processing for the third page, for example, the job-management module 54 inputs, to the division module 55, a division instructing command attached with (a) the second analysis data size K and the third analysis data size K, and (b) area designating information for designating a storage area of the RAM 25. The division module 55 uses the second analysis data size K and the third analysis data size K, as illustrated in FIG. 5, to divide the compressed image data at a position located between the compressed data for the second-page image and the third-page header information and attach the document information to create partial compressed data of the third page and its remaining data. The job-management module 54 at S63 stores the created partial compressed data of the third page into the specific storage area of the RAM 25 of the memory 22. The remaining data is deleted without being stored into the memory 22.

The processing at S63 in which the division module 55 stores the partial compressed data for each of the first page, the second page, and the third page into the memory 22 is another example of the second storing processing.

The job-management module 54 determines whether the division module 55 has executed the division processing and the storing processing (S63) after the division instructing command is input to the division module 55. For example, the job-management module 54 uses polling, for example, to monitor the storage area of the RAM 25 designated by the division instructing command, and when the partial compressed data is stored into the storage area, the job-management module 54 determines that the division processing and the storing processing have been executed. Alternatively, when a response to the division instructing command is received from the division module 55 having executed the division processing, the job-management module 54 determines that the division processing and the storing processing have been executed.

When the job-management module 54 determines that the division processing and the storing processing have been executed, the job-management module 54 at S64 inputs, to the decompression module 56, a decompression instructing command for instructing decompression. The decompression instructing command is attached with area designating information indicating the storage area of the RAM 25 storing the partial compressed data and a storage area of the RAM 25 for storing the decompressed page data after decompression.

In response to receiving the decompression instructing command (S64), the decompression module 56 executes a decompression processing at S65. Specifically, the decompression module 56 reads the partial compressed data from the RAM 25 of the memory 22. The decompression module 56 then creates the decompressed page data by decompressing the partial compressed data read from the RAM 25. The decompression module 56 at S66 stores the decompressed page data into the storage area of the RAM 25 which is designated by the job-management module 54.

It is noted that the job-management module 54 may output the decompression instructing command without determining whether the division processing has been executed. In this case, in response to receiving the decompression instructing command, the decompression module 56 uses polling, for example, to monitor whether the partial compressed data is stored into the RAM 25 of the memory 22, and the decompression module 56 executes the decompression processing (S65) when the partial compressed data is stored into the RAM 25.

After inputting the decompression instructing command into the decompression module 56, the job-management module 54 determines whether the decompression module 56 has executed the decompression processing and the storing processing (S66). For example, the job-management module 54 uses polling, for example, to monitor the storage area of the RAM 25 designated by the decompression instructing command, and when the decompressed page data is stored into the storage area, the job-management module 54 determines that the decompression module 56 has executed the decompression processing and the storing processing. Alternatively, the job-management module 54 determines that the decompression module 56 has executed the decompression processing and the storing processing, when the job-management module 54 has received a response to the decompression instructing command from the decompression module 56 having executed the decompression processing.

When the job-management module 54 determines that the decompression module 56 has executed the decompression processing and the storing processing, the job-management module 54 at S67 inputs a conversion instructing command to the conversion module 57. The conversion instructing command is attached with area designating information indicating the storage area of the RAM 25 storing the decompressed page data and a storage area of the RAM 25 for storing the print data.

In response to receiving the conversion instructing command (S67), the conversion module 57 executes a conversion processing at S68. Specifically, the conversion module 57 reads the decompressed page data from the RAM 25 of the memory 22. The conversion module 57 creates print data for one page by performing conversion, such as the rotation, the color conversion, the error diffusion, and the quinary conversion, to the decompressed page data read from the RAM 25. The conversion module 57 at S69 stores the created print data for one page, into the storage area of the RAM 25 which is designated by the job-management module 54. The processing at S68 in which the conversion module 57 converts the decompressed page data to create the print data is one example of a first creating processing and a creating processing.

It is noted that the job-management module 54 may output the conversion instructing command without determining whether the decompression processing is executed. In this case, in response to receiving the conversion instructing command, the conversion module 57 uses polling, for example, to monitor whether the decompressed page data is stored in the RAM 25 of the memory 22, and the conversion module 57 executes the conversion processing (S68) when the decompressed page data is stored into the RAM 25.

After inputting the conversion instructing command to the conversion module 57, the job-management module 54 determines whether the conversion module 57 has executed the conversion processing and the storing processing (S69). For example, the job-management module 54 uses polling, for example, to monitor the storage area of the RAM 25 designated by the conversion instructing command, and when the print data is stored into the storage area, the job-management module 54 determines that the conversion module 57 has executed the conversion processing and the storing processing. Alternatively, the job-management module 54 determines that the conversion module 57 has executed the conversion processing and the storing processing, when the job-management module 54 has received a response to the conversion instructing command from the conversion module 57 having executed the conversion processing and the storing processing.

When the job-management module 54 determines that the conversion module 57 has executed the conversion processing and the storing processing, as illustrated in FIG. 2, the job-management module 54 at S20 executes a print-data output processing to output the print data to the drive circuit 35 and the drive motor 36. Specifically, when the job-management module 54 determines that the conversion module 57 has executed the conversion processing and the storing processing, the job-management module 54 inputs an output instructing command to the print-control module 58. The output instructing command is attached with area designating information indicating the storage area of the RAM 25 storing the print data.

In response to receiving the output instructing command, the print-control module 58 reads the print data from the RAM 25 of the memory 22. The print-control module 58 outputs the print data read from the RAM 25, to the drive circuit 35 and the drive motor 36. The processing at S20 is one example of a first output processing and an output processing.

In response to receiving the print data, the print engine 15 at S21 prints an image on the sheet.

The job-management module 54 at S22 finishes the page job for the first page when an image for the first page is printed on the sheet by the print engine 15. The job-management module 54 at S23 determines whether an unprocessed page job or jobs are stored in the memory 22. That is, the job-management module 54 at S23 determines whether there is a page to be printed.

When the job-management module 54 determines that the unprocessed page job or jobs are stored in the memory 22 (S23: Yes), the job-management module 54 executes the processings at S18 and subsequent steps again to create the print data for the second page and the third page and output the created print data to the print engine 15.

It is noted that, though not indicated by the flowchart, when the print engine 15 finishes printing the one page, the job-management module 54 deletes the print queue corresponding to the page for which printing is finished, from the memory 22.

When the job-management module 54 at S23 determines that no unprocessed page jobs are stored in the memory 22 (S23: No), the job-management module 54 at S24 finishes the print job, and this process ends.

Effects

The controller 11 at S65 decompresses one partial compressed data, at S68 creates the print data for one page based on the decompressed page data obtained by decompression, and at S20 outputs the created print data for one page. The controller 11 repeats creation and output of print data for one page (S23: Yes). With this configuration, even the printer 10 including the memory 22 not having a capacity enough to process the entire decompressed image data for the plurality of pages can perform printing based on the compressed image data containing the plurality of pages. Alternatively, it is possible to reduce the capacity of the RAM 25 of the memory 22 of the printer 10.

In the present embodiment, when the analysis height D is greater than or equal to the height value B, the analysis data size K for identifying the unit data representing the last pixel of the page is stored into the memory 22, and the compressed image data is divided into the partial compressed data using the analysis data size K stored in the memory 22. This configuration makes it possible to identify unit data serving as separation between pages and divide the compressed image data into the partial compressed data without decompressing the compressed image data.

FIRST MODIFICATION

In the above-described embodiment, the compressed image data is divided by the division module 55 of the job-management module 54. However, the compressed image data may be divided by the analysis module 53. In this case, the division module 55 is not provided in the job-management module 54. After the analysis process at S15 (FIG. 2), the analysis module 53 executes the division processing at S62 (FIG. 4) to store the partial compressed data for the first page, the partial compressed data for the second page, and the partial compressed data for the third page into the RAM 25 of the memory 22. Specifically, the analysis module 53 stores the partial compressed data for the first page into a first storage area secured in the RAM 25 by the application 51, stores the partial compressed data for the second page into a second storage area secured in the RAM 25 by the application 51, and stores the partial compressed data for the third page into a third storage area secured in the RAM 25 by the application 51. The job-management module 54 handles the partial compressed data stored in the first storage area as the partial compressed data for the first page, handles the partial compressed data stored in the second storage area as the partial compressed data for the second page, and handles the partial compressed data stored in the third storage area as the partial compressed data for the third page. That is, based on the storage area storing the partial compressed data, the job-management module 54 determines which page the partial compressed data corresponds to. The processing in which the analysis module 53 stores the partial compressed data for the first page into the first storage area, stores the partial compressed data for the second page into the second storage area, and stores the partial compressed data for the third page into the third storage area is yet another example of the second storing processing.

Thus, in the case where the compressed image data is divided into a plurality of partial compressed data in the analysis module 53, the RAM 25 having a capacity enough to store the partial compressed data for the first page, the partial compressed data for the second page, and the partial compressed data for the third page is required. That is, the RAM 25 having a large capacity is required when compared with the above-described embodiment which at least needs the RAM 25 having a capacity enough to individually store each of the partial compressed data for the first page, the partial compressed data for the second page, and the partial compressed data for the third page. In the above-described embodiment, however, the controller 11 needs to execute three division processings, i.e., the division processing for creating the partial compressed data for the first page, the division processing for creating the partial compressed data for the second page, and the division processing for creating the partial compressed data for the third page, but in the case where the analysis module 53 divides the compressed image data, it is possible to create all the partial compressed data with one division processing. That is, in the case where the analysis module 53 divides the compressed image data, the RAM 25 having a large capacity is required when compared with the above-described embodiment, but it is possible to further reduce the length of time required for creation of the print data.

SECOND MODIFICATION

As illustrated in FIG. 3, the analysis module 53 at S31 determines whether the data amount of the compressed image data is less than a reference value stored in the memory 22. The reference value is a value that is used for determining whether the data amount of the partial compressed data is such a large amount that a processing of creating print data from the created partial compressed data cannot be executed even when the partial compressed data is created by dividing the compressed image data, for example. Also, the reference value is a value which is stored in advance in the ROM 24 or the EEPROM of the memory 22 in accordance with the capacity of the RAM 25 of the memory 22. The reference value is one example of a second threshold value. The processing at S31 is one example of a data-amount determining processing.

When the analysis module 53 determines that the data amount of the compressed image data is less than the reference value (S31: Yes), the analysis module 53 executes the processings at S33 and subsequent steps.

When the analysis module 53 determines that the data amount of the compressed image data is not less than the reference value (S31: No), the analysis module 53 at S32 reduces the size of an image represented by the compressed image data while decompressing the compressed image data and stores decompressed size-reduced data into the RAM 25 of the memory 22, and the analysis process ends. The size of the compressed image data is reduced by thinning out the pixels representing the image, for example. The reduction ratio is determined in advance and stored in the memory 22 or determined by the analysis module 53 in accordance with the data amount of the compressed image data, for example. The processing at S32 is one example of a reduced-size-page-data obtaining processing. The decompressed size-reduced data is one example of reduced-size page data.

Though not indicated by the flowchart in FIG. 2, in the case where the processing at S32 is executed, the job-management module 54 skips the processing at S17 and uses the conversion module 57 at S18 to perform conversion, such as the rotation, the color conversion, the error diffusion, and the quinary conversion, to the decompressed size-reduced data for the first page and then enlarge the decompressed size-reduced data to create the print data for the first page. The job-management module 54 at S20 outputs the created print data for the first page to the print engine 15. The processing in which the job-management module 54 converts and enlarges the decompressed size-reduced data to create the print data for the first page is one example of a second creating processing. The processing at S20 in which the job-management module 54 outputs the print data for the first page created in the second creating processing is one example of a second output processing.

When the job-management module 54 determines that there is a page or pages for which print data have not been created, such as the second page and the third page (S23: Yes), the job-management module 54 at S20 creates print data for the second page and print data for the third page in a manner similar to that for the first page and outputs the created print data in order. That is, the second creating processing of creating the print data for a page based on the decompressed size-reduced data, and the second output processing of outputting the created print data are repeated a number of times corresponding to the number of pages contained in the compressed image data.

In the present modification, in the case where the data size of the compressed image data is such a large size that, even when the partial compressed data for each page is created by dividing the compressed image data, the job-management module 54 cannot execute the processing of creating the print data based on the created partial compressed data, it is possible to print images on the respective sheets based on the compressed image data.

It is noted that the processing at S31 may be executed by the job-management module 54. In this case, the analysis module 53 executes the analysis process in a manner similar to that in the embodiment and registers each found page with the job-management module 54. When the job-management module 54 determines that the data amount of the compressed image data is not less than the reference value, the job-management module 54 instructs the division module 55 to execute the processing at S32 instead of transmitting the division instructing command (S61). The division module 55 creates the decompressed size-reduced data by executing the processing at S32 according to the instruction received from the job-management module 54 and stores the created decompressed size-reduced data into the memory 22.

THIRD MODIFICATION

In the above-described second modification, the processing at S32 is executed to create the decompressed size-reduced data, in the case where the data amount of the compressed image data is less than the reference value stored in the memory 22. In the above-described embodiment or the second modification, however, the processing at S32 may be executed when the analysis data size K cannot be stored into the memory 22 at S53 in the analysis process.

FOURTH MODIFICATION

In the present modification, there will be described secure print which requires an input of authentication information for printing of an image.

The compressed image data obtained at S11 by the reception module 52 contains check information indicating whether the authentication information and an input of the authentication information are required. The application 51 determines, based on the check information, whether the compressed image data obtained by the reception module 52 is compressed image data that requires an input of the authentication information. When the application 51 determines that the compressed image data obtained by the reception module 52 is not the compressed image data that requires an input of the authentication information, the job-management module 54 creates the print data in a manner similar to that in the embodiment and outputs the created print data to the print engine 15 to print an image on the sheet.

When the application 51 determines that the compressed image data obtained by the reception module 52 is the compressed image data that requires an input of the authentication information, the job-management module 54 creates the print data in a manner similar to that in the embodiment. The application 51 stores the created print data into the memory 22 and waits for an input of the authentication information. The authentication information is one example of an output instruction. The processing in which the application 51 stores the created print data into the memory 22 and waits for an input of the authentication information is one example of a waiting processing.

One example of the authentication information is a personal identification number (PIN) set by the user. The authentication information is input from the information processing device to the printer 10, for example. Alternatively, the authentication information is directly input to the printer 10 with the touch sensor provided on the display 13 and the operation switch 14.

When the authentication information is input, the application 51 determines whether the input authentication information matches the authentication information contained in the compressed image data. When the application 51 determines that the input authentication information does not match the authentication information contained in the compressed image data, the application 51 controls the display 13 to display an image indicating that the input authentication information does not match the authentication information contained in the compressed image data, or transmits the image to the information processing device via the communication interface 12.

When the application 51 determines that the input authentication information matches the authentication information contained in the compressed image data, the application 51 instructs the job-management module 54 to output the print data stored in the memory 22, to the print engine 15.

The printer 10 according to the present modification is capable of printing images on the respective sheets based on the compressed image data even in the secure print.

It is noted that the secure print is described in the present modification as one example of saving printing. However, the saving printing may be any printing as long as the printing requires an input of the output instruction such as the authentication information.

FIFTH MODIFICATION

In the present modification, there will be described an example in which the control program 27 executes a reprint process illustrated in FIG. 6B. The reprint process is a process in which, in the event of a jam of a sheet in the print engine 15, the control program 27 outputs the print data to the print engine 15 again to print, on a new sheet, an image planned to be printed on the jammed sheet.

After outputting the print data to the print engine 15 at S20 (FIG. 2), the job-management module 54 at S71 determines whether an image represented by the output print data is printed on the sheet. For example, the job-management module 54 calculates a rotation amount of the conveying roller 33 using a detection signal input from a rotary encoder provided on the conveying roller 33, and when a conveyance amount of the sheet which is indicated by the calculated rotation amount of the conveying roller 33 has reached a conveyance amount for one page, the job-management module 54 determines that the image represented by the output print data has been printed on the sheet (S71: Yes). It is noted that the job-management module 54 may execute this determination in any method as long as the job-management module 54 can determine whether the image represented by the output print data has been printed on the sheet. The processing at S71 is one example of an end determining processing.

When the job-management module 54 determines that an image for one page represented by the output print data has been printed on the sheet (S71: Yes), the job-management module 54 at S76 allows overwriting of the output print data stored in the memory 22, and the reprint process ends.

When the job-management module 54 determines that the print engine 15 is printing the image for one page represented by the output print data (S71: No), the job-management module 54 at S72 inhibits overwriting of the output print data stored in the memory 22. That is, the print data for one page output to the print engine 15 is not overwritten in the memory 22 until the image represented by the print data is printed on the sheet.

The job-management module 54 at S73 determines whether an error has occurred. For example, the job-management module 54 determines that an error due to a jam of the sheet has occurred, when the conveyance amount of the sheet which is indicated by the calculated rotation amount of the conveying roller 33 is not equal to the conveyance amount to be indicated by the print data. Alternatively, the job-management module 54 determines that the error has occurred, when a predetermined detection signal is input from a sensor. Examples of the sensor include: an open/close sensor configured to detect opening and/or closing a cover covering the print engine 15; an installation/removal sensor configured to detect installation and/or removal of the sheet-supply tray; and a sheet sensor configured to detect the sheet being conveyed. The value of a signal output from the open/close sensor changes with opening and closing of the cover. The value of a signal output from the installation/removal sensor changes so as to be different between the case where the sheet-supply tray is installed in the printer 10 and the case where the sheet-supply tray is removed from the printer 10. The value of a signal output from the sheet sensor changes so as to be different between the case where the sheet is being conveyed and the case where the sheet is not being conveyed. The job-management module 54 determines that an error due to impossible continuation of printing has occurred when the job-management module 54, based on a change of the signal input from the sensor, determines that the closed cover is opened, that the installed sheet-supply tray is removed from the printer 10, or that there is no sheet on the sheet-supply tray, and no sheet is being conveyed. It is noted that the error is not limited to the above-described examples and may be any error as long as printing cannot be continued.

While the print engine 15 is performing printing based on the print data (S71: No), the job-management module 54 monitors an occurrence of the error (S73: No).

When the job-management module 54 determines that the error has occurred (S73: Yes), the job-management module 54 at S74 determines whether the error is eliminated. For example, the job-management module 54 determines that the error is eliminated, when the user closes the cover after opening the cover and removing the jammed sheet from the print engine 15. Specifically, the job-management module 54 determines that the error is eliminated (S74: Yes), when the job-management module 54 has detected closing of the cover based on a change of the signal output from the open/close sensor after detecting opening of the cover based on a change of the signal output from the open/close sensor.

In another case, the job-management module 54 determines that the error is eliminated, when the user has installed the sheet-supply tray in the printer 10 after removing the sheet-supply tray from the printer 10 and replenishing the sheet-supply tray with new sheets. Specifically, the job-management module 54 determines that the error is eliminated (S74: Yes), when the job-management module 54 has detected installation of the sheet-supply tray in the printer 10 based on a change of the signal output from the installation/removal sensor after detecting removal of the sheet-supply tray from the printer based on a change of the signal output from the installation/removal sensor.

In yet another case, the job-management module 54 determines that the error is eliminated (S74: Yes), when the job-management module 54 has received an input of an instruction indicating a restart of the printing, using the touch sensor of the display 13 and/or the operation switch 14. Each of the signal output from the sensor and indicating the error is eliminated, and an instruction indicating the restart of the printing is one example of a restart enabling input. The processing at S74 in which the job-management module 54 receives the signal output from the sensor and indicating the error is eliminated or the instruction indicating the restart of the printing is one example of a restart-enabling-input receiving processing.

The job-management module 54 executes the processing at S74 until the error is eliminated (S74: No). When the job-management module 54 determines that the error is eliminated (S74: Yes), the job-management module 54 executes a re-output processing at S75. The re-output processing is a processing for outputting the print data for one page stored in the memory 22, to the print engine 15 again.

After executing the re-output processing (S75), the job-management module 54 executes the processings at S71 and subsequent steps again.

In the present modification, in the case where an error has occurred such as a jamming of the sheet and no sheet for printing, it is possible to immediately output the print data for one page to the print engine 15 without executing the division processing, the decompression processing, and the conversion processing again. Accordingly, a length of time required for printing is reduced in the re-output processing when compared with the case where the print data is created again.

SIXTH MODIFICATION

In the present modification, there will be described an example in which the partial compressed data for one page is further divided into a plurality of separate partial compressed data to create print data. Processings in the present modification are executed in the case where the print data cannot be created by dividing the compressed image data for each page, for example. For example, the processings in the present modification are executed in the case where the resolution is high.

Figure 8A:
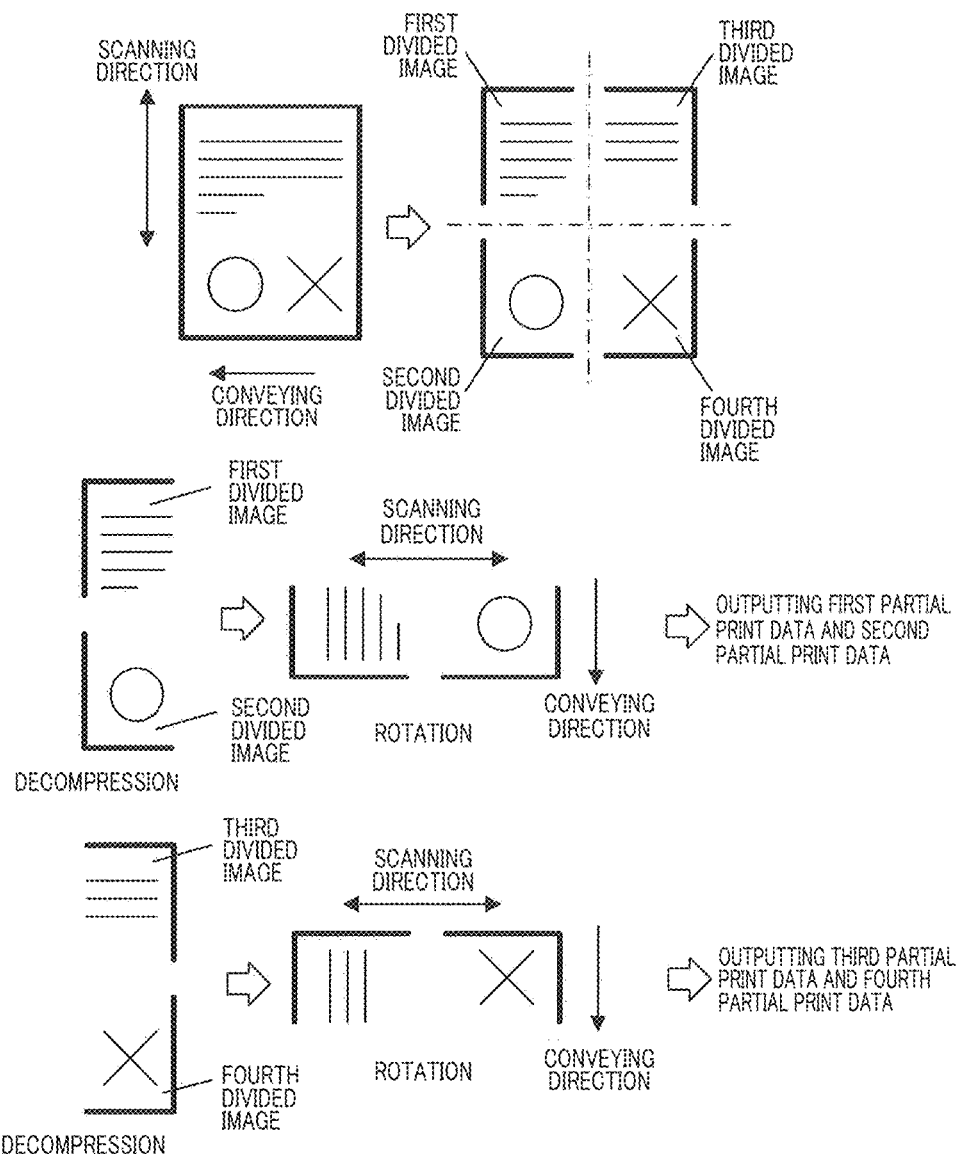
FIG. 8A is a view for explaining division of an image corresponding to one page.

Each of the separate partial compressed data represents a separate image illustrated in FIG. 8A. In the example illustrated in FIG. 8A, the partial compressed data for one page is divided into four separate partial compressed data. The four separate partial compressed data respectively represent a first separate image, a second separate image, a third separate image, and a fourth separate image. In this example, the image illustrated in FIG. 6A is divided into two portions in each of the height direction and the width direction as illustrated in FIG. 8A. Specifically, the image in the resolution of eight pixels in width and ten pixels in height is divided into four equal portions. The separate image is one example of a partial image.

Figure 7:
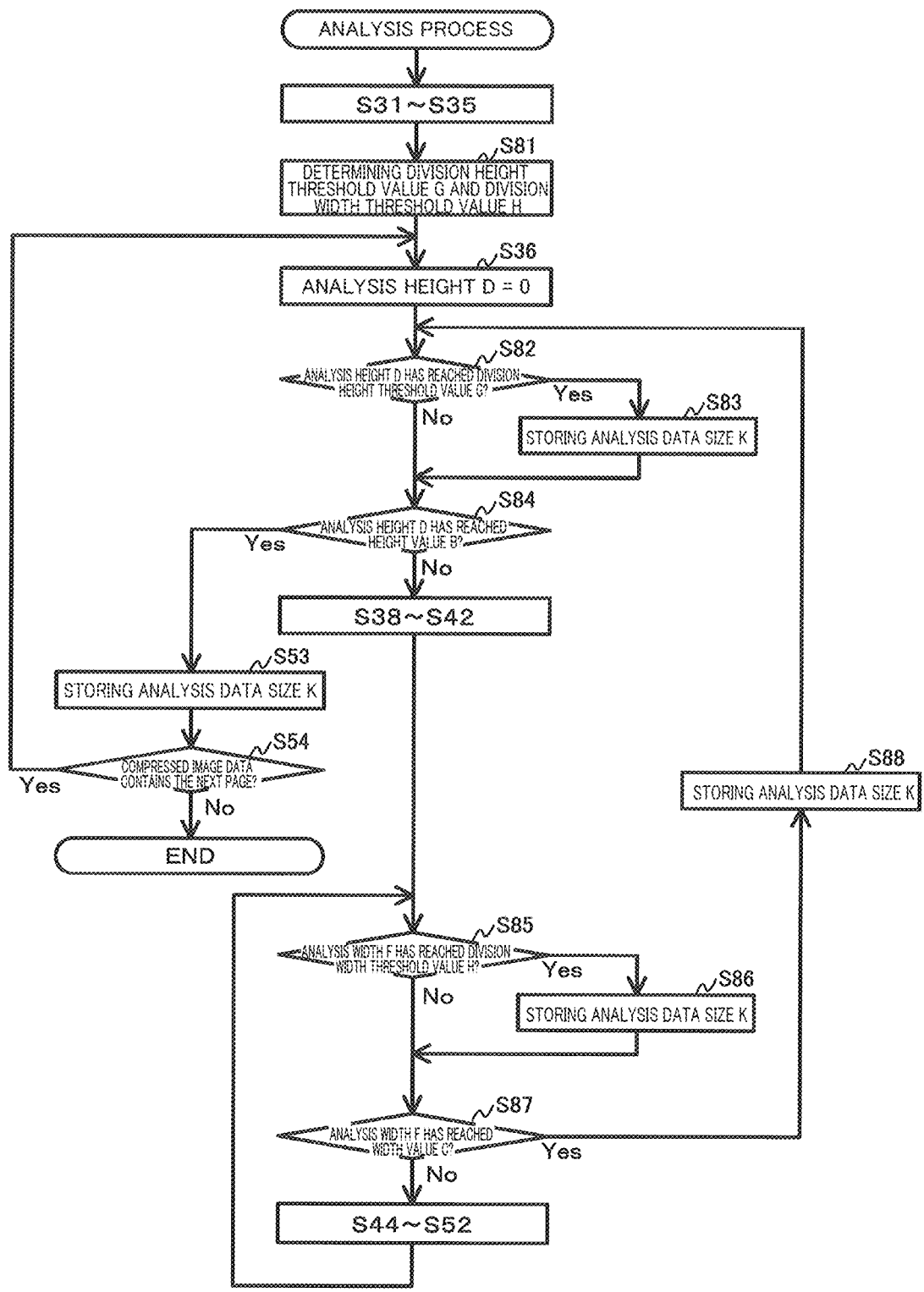
FIG. 7 is a flowchart representing an analysis process in a sixth modification.

Though not indicated by the flowchart, when the resolution contained in the document information which is obtained from the compressed image data is greater than or equal to a threshold value stored in the memory 22 in advance, the analysis module 53 executes an analysis process illustrated in FIG. 7 instead of the analysis process illustrated in FIG. 3. It is noted that the same numbers as used in the processings in the analysis process illustrated in FIG. 3 are used to designate the corresponding processings in FIG. 7, and an explanation of which is dispensed with. The resolution is one example of a value indicated by the compressed image data. The processing in which the analysis module 53 determines whether the resolution is greater than or equal to the threshold value is one example of an execution determining processing.

As illustrated in FIG. 7, the analysis module 53 executes the processings at S31-S35. The analysis module 53 at S81 determines a division height threshold value G based on the height value B and two as the number of divisions in the height direction and determines a division width threshold value H based on the width value C and two as the number of divisions in the width direction. Specifically, the analysis module 53 determines the division height threshold value G to five obtained by dividing ten as the height value B by two and determines the division width threshold value H to four obtained by dividing eight as the width value C by two. The number of divisions is stored in the memory 22 in advance or determined by the analysis module 53 or the application 51 based on the data amount of the compressed image data. It is noted that, in the case where the image is divided in only the height direction or the width direction, only the division height threshold value G or the division width threshold value H is determined at S81.

After setting the analysis height D to zero (S36), the analysis module 53 at S82 determines whether the analysis height D has reached five as the division height threshold value G. When the analysis module 53 determines that the analysis height D has reached five as the division height threshold value G (S82: Yes), the analysis module 53 at S83 stores the analysis data size K indicating the number of read unit data, into the memory 22. That is, the analysis data size K identifying unit data indicating a dividing position in the height direction is stored into the memory 22 at S83.

When the analysis module 53 determines that the analysis height D has not reached or had reached five as the division height threshold value G (S82: No), the analysis module 53 skips the processing at S83 and determines at S84 whether the analysis height D has reached the height value B. That is, the analysis module 53 at S84 determines whether the analysis of the image for one page is completed.

When the analysis module 53 determines that the analysis height D has reached the height value B (S84: Yes), the analysis module 53 executes the processings at S53 and S54. When the analysis module 53 determines that the analysis height D has not reached the height value B (S84: No), the analysis module 53 executes the processings at S38-S42.

The analysis module 53 at S85 determines whether the analysis width F has reached four as the division width threshold value H. When the analysis module 53 determines that the analysis width F has reached four as the division width threshold value H (S85: Yes), the analysis module 53 at S86 stores the analysis data size K into the memory 22. That is, the analysis data size K identifying unit data indicating a dividing position in the width direction is stored into the memory 22 at S86.

When the analysis module 53 determines that the analysis width F has not reached or had reached four as the division width threshold value H (S85: No), the analysis module 53 skips the processing at S86 and determines at S87 whether the analysis width F has reached the width value C. That is, the analysis module 53 at S87 determines whether the analysis of the image is completed to its right end.

When the analysis module 53 determines that the analysis width F has reached the width value C (S87: Yes), the analysis module 53 at S88 stores the analysis data size K into the memory 22 and executes the processings at S82 and subsequent steps again. That is, the analysis data size K identifying unit data indicating a dividing position in the width direction is stored into the memory 22 at S88.

When the analysis module 53 determines that the analysis width F has not reached the width value C (S87: No), the analysis module 53 executes the processing at S85 again after executing the processings at S44-S52.

The processings at S83, S86, and S88 in which the analysis module 53 stores the analysis data size into the memory 22 are one example of a second identifying processing and a third storing processing.

Figure 4:
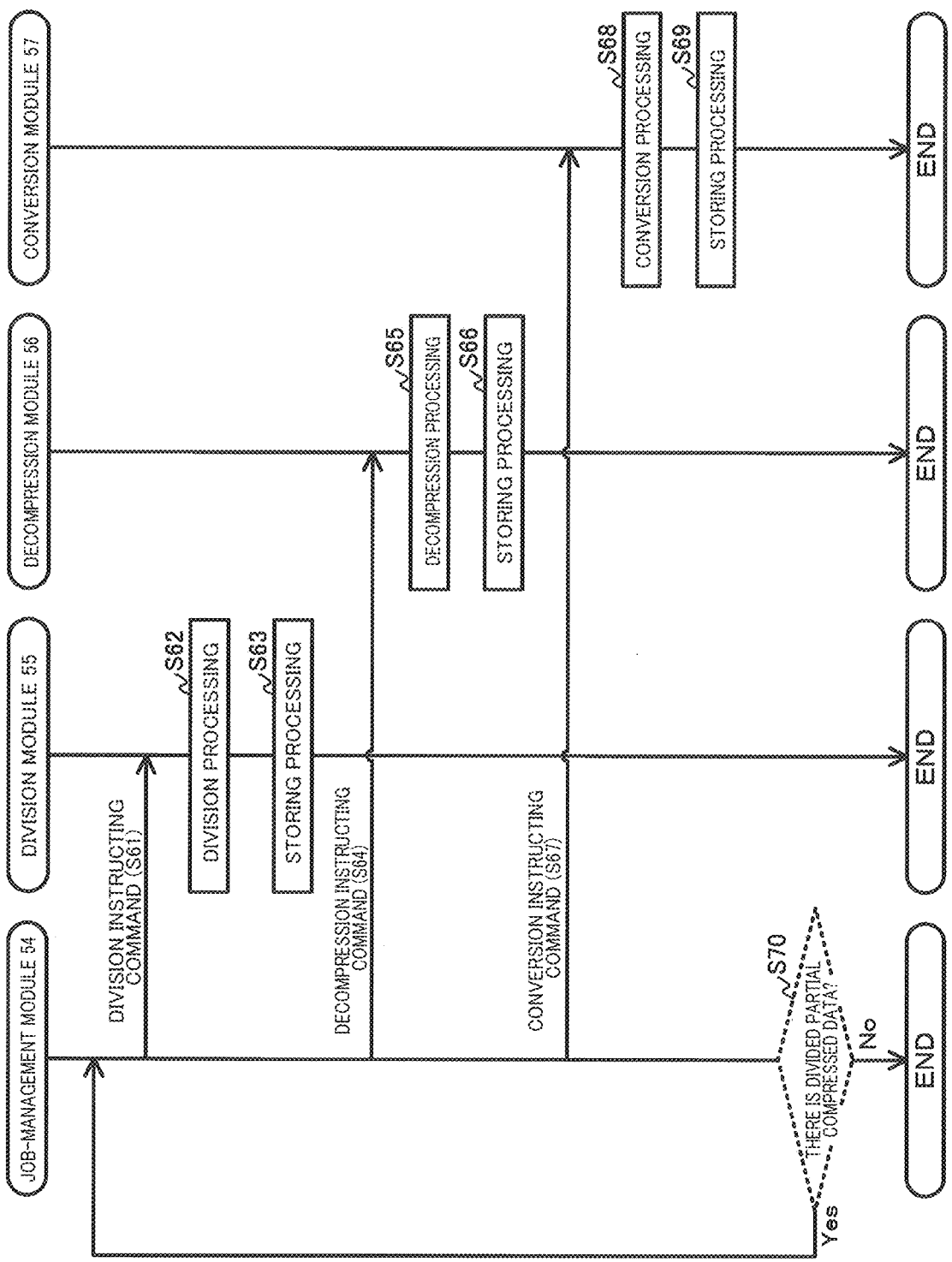
FIG. 4 is a view for explaining processings to be executed by a job-management module.

The job-management module 54 executes the following print-data creating process instead of the print-data creating process at S19 (FIG. 4).

Instead of the dividing instruction (S61) in the above-described embodiment, the job-management module 54 transmits a dividing instruction to the division module 55 to instruct the division module 55 to divide the compressed image data to create the separate partial compressed data. Instead of the division processing (S62) in the above-described embodiment, the division module 55 executes the division processing for creating the separate partial compressed data.

Specifically, the division module 55 reads the compressed image data from the RAM 25 of the memory 22. The division module 55 uses the analysis data size K to divide the compressed image data into (a) first separate partial compressed data that is the separate partial compressed data indicating the first separate image and (b) its remaining data.

The division module 55 then deletes the remaining data and stores the first separate partial compressed data into the RAM 25 of the memory 22.

Figure 8B:
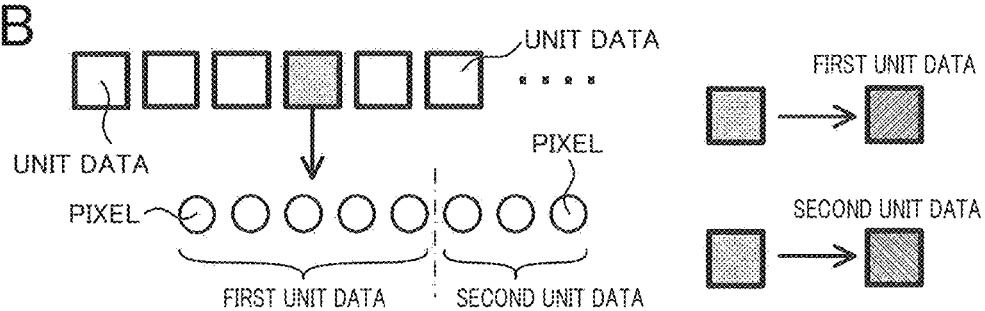
FIG. 8B is a view for explaining creation of first unit data and second unit data.

More specifically, the unit data illustrated in grey in FIG. 8B is represented by the analysis data size K and indicates the pixel located at the dividing position. The unit data represents a plurality of pixels. The image is divided into the first separate image and the second separate image at the dividing position between these pixels. The dividing position is indicated by the one-dot chain line in FIG. 8B.

The division module 55 determines which pixel row is contained in the first separate image between a first pixel row constituted by a plurality of pixels located to the left of the dividing position in FIG. 8B and a second pixel row constituted by a plurality of pixels located to the right of the dividing position in FIG. 8B among the plurality of pixels represented by the unit data indicated by the analysis data size K. The pixel row contained in the first separate image is compressed in the same method as used for the compressed image data to create first unit data. The division module 55 replaces the created first unit data with the unit data illustrated in grey represented by the analysis data size K. The division module 55 incorporates a plurality of unit data before the first unit data, or the first unit data and a plurality of unit data after the first unit data into the first separate partial compressed data. It is noted that, in the case where second separate partial compressed data representing the second separate image is created, second unit data is created in a manner similar to that for the first unit data.

In the case where the division module 55 determines that the image is to be divided into the first separate image and the other separate image in the unit data represented by the analysis data size K, the division module 55 incorporates the unit data to the unit data indicated by the analysis data size K, into the first separate partial compressed data without creating the first unit data and the second unit data, or incorporates the unit data represented by the analysis data size K and the unit data after the unit data represented by the analysis data size K, into the first separate partial compressed data.

It is noted that the method of creating the first unit data and the second unit data is one example, and the first unit data and the second unit data may be created in any method.

The division module 55 executes the above-described processing for each of a plurality of dividing positions respectively represented by a plurality of analysis data sizes K contained in dividing-position information to divide the compressed image data into the first separate partial compressed data and its remaining data.

After executing the division processing, the division module 55 stores the first separate partial compressed data created in the division processing, into a specific storage area of the RAM 25 of the memory 22. The specific storage area is an area designated by the job-management module 54 in the dividing instruction. The processing in which the first separate partial compressed data is stored into the specific storage area of the RAM 25 is another example of the third storing processing.

Instead of the decompression instructing command at S64, the job-management module 54 sends the decompression module 56 a decompression instructing command for instructing the decompression module 56 to create first divided partly-decompressed data by decompressing the first separate partial compressed data stored in the specific storage area of the RAM 25. The decompression module 56 uses polling, for example, to monitor the storage area of the RAM 25 designated by the decompression instructing command, and when the first separate partial compressed data is stored into the RAM 25, the decompression module 56 reads the first separate partial compressed data from the RAM 25 and decompresses the first separate partial compressed data. The decompression module 56 then stores the first divided partly-decompressed data obtained by the decompression, into the storage area of the RAM 25 designated by the decompression instructing command. The divided partly-decompressed data is one example of decompressed partial image data.

Instead of the conversion instructing command at S67, the job-management module 54 inputs, to the conversion module 57, a conversion instructing command for instructing the conversion module 57 to convert the first divided partly-decompressed data stored in the specific storage area of the RAM 25, into first partial print data. The conversion module 57 uses polling, for example, to monitor the storage area of the RAM 25 indicated by the conversion instructing command, and when the first divided partly-decompressed data is stored into the RAM 25, the conversion module 57 reads the first divided partly-decompressed data from the RAM 25 and converts the first divided partly-decompressed data to create the first partial print data. The processing in which the conversion module 57 creates the first partial print data is one example of a partial-print-data creating processing.

The job-management module 54 determines at S70 in FIG. 4 whether there is the separate partial compressed data that requires conversion for outputting the first partial print data. Specifically, the head 31 (FIG. 1A) prints an image on the sheet while reciprocating in the scanning direction indicated in FIG. 8A. Thus, in order for the head 31 to print an image on the sheet, second partial print data that is partial print data representing the second separate image is required in addition to the first partial print data. The job-management module 54 determines, based on the model information and the dividing information, whether there is partial compressed data that requires conversion for outputting the print data.

When the job-management module 54 determines that there is partial compressed data that requires conversion for outputting the print data (S70: Yes), the job-management module 54 inputs, to the division module 55, a division instructing command for creating the separate partial compressed data that requires conversion for outputting the print data.

In a manner similar to the above-described manner, the division module 55 divides the compressed image data into the second separate partial compressed data representing the second separate image and its remaining data, deletes the remaining data, and stores only the second separate partial compressed data into the specific storage area of the RAM 25 of the memory 22.

In a manner similar to the above-described manner, the job-management module 54 inputs the decompression instructing command and the conversion instructing command to the decompression module 56 and the conversion module 57 and instructs the conversion module 57 to create the second partial print data representing the second separate image.

When the job-management module 54 determines that that there is no partial compressed data that requires conversion for outputting the print data (S70: No), the print-data creating process ends. As illustrated in FIG. 2, the job-management module 54 at S20 outputs the created first partial print data and second partial print data to the drive circuit 35 and the drive motor 36 of the print engine 15. The processing at S20 for outputting the first partial print data and the second partial print data is one example of a partial-image-data output processing.

After executing the processing at S20, the job-management module 54 determines at S25 whether there are separate images having not been converted to partial print data. When the job-management module 54 determines that there are the third separate image and the fourth separate image are present as the separate images having not been converted to partial print data (S25: Yes), the job-management module 54 executes the print-data creating process to create third partial print data representing the third separate image and fourth partial print data representing the fourth separate image. The job-management module 54 at S20 outputs the created third partial print data and fourth partial print data to the print engine 15. That is, the job-management module 54 repeats creation and output of the partial print data a number of times related to the number of the separate images.

In the present modification, even in the case where the resolution is high, it is possible to print images on the respective sheets based on the compressed image data.

OTHER MODIFICATIONS

In the above-described embodiment, it is determined whether the analysis of one page is finished, based on determining whether the analysis height D is less than the height value B (S37) in the analysis process. That is, the height value B indicating the resolution in the height direction indicated by the document information is one example of the first threshold value in the above-described embodiment. However, it is determined whether the analysis of one page is finished, based on determining whether the total number of pixels represented by the analyzed unit data has reached the total number of pixels for one page which is indicated by the resolution. The total number of pixels for one page which is indicated by the resolution is 360000 in the case where the resolution is 600×600, for example. That is, the total number of pixels determined by the resolution indicated by the document information may be the first threshold value.

What is claimed is:

1. A printing apparatus, comprising:
   a memory; and
   a controller configured to execute:
      a receiving processing in which the controller receives compressed image data that is data created by compressing image data for a plurality of pages;
      a first storing processing in which the controller stores the compressed image data into the memory;
      a first identifying processing in which the controller individually identifies a plurality of partial compressed data corresponding to the plurality of pages in the compressed image data stored in the memory;
      a second storing processing in which the controller stores one partial compressed data of the plurality of partial compressed data into the memory or stores information identifying each of the plurality of partial compressed data in the compressed image data, into the memory;
      a first creating processing in which the controller decompresses the one partial compressed data of the plurality of partial compressed data and creates print data for one page based on decompressed page data that is data for one page obtained by decompressing the one partial compressed data; and
      a first output processing in which the controller outputs the created print data, the controller being configured to repeat the first creating processing and the first output processing a number of times corresponding to the number of pages contained in the compressed image data, and
   the printing apparatus being configured to perform printing based on the print data output in the first output processing.

2. The printing apparatus according to claim 1, wherein the controller is configured to, in the first identifying processing:
   when a count value obtained by counting pixels of an image corresponding to the compressed image data has reached a first threshold value that is the number of pixels corresponding to one page, execute identification of the one partial compressed data corresponding to the one page; and
   repeat the identification to identify the plurality of pages contained in the compressed image data.

3. The printing apparatus according to claim 2, wherein the controller is configured to execute:
   an obtaining processing in which the controller obtains document information contained in the compressed image data; and
   a threshold-value determining processing in which the controller determines the first threshold value based on the document information.

4. The printing apparatus according to claim 1,
   wherein the compressed image data comprises: a plurality of pieces of page header information respectively corresponding to the plurality of pages; and the plurality of partial compressed data respectively corresponding to the plurality of pieces of page header information, and
   wherein the controller is configured to, in the first identifying processing:
      identify first-page header information of the plurality of pieces of page header information and partial compressed data representing a first-page image among the plurality of partial compressed data, as partial compressed data corresponding to a first page of the plurality of pages; and
      identify second-page header information of the plurality of pieces of page header information and partial compressed data representing a second-page image among the plurality of partial compressed data, as partial compressed data corresponding to a second page of the plurality of pages.

5. The printing apparatus according to claim 4, wherein each of the plurality of pieces of page header information comprises at least one of a print setting and a resolution of a corresponding one of the plurality of pages.

6. The printing apparatus according to claim 4,
   wherein the compressed image data contains document information, and
   wherein each of the partial compressed data corresponding to the first page and the partial compressed data corresponding to the second page contains the document information.

7. The printing apparatus according to claim 4, wherein the controller is configured to, in the first identifying processing, identify the partial compressed data corresponding to the first page based on data located between the first-page header information and the second-page header information in the compressed image data.

8. The printing apparatus according to claim 4, wherein the controller is configured to, in the first creating processing:

create print data corresponding to the first page, based on the partial compressed data corresponding to the first page; and create print data corresponding to the second page, based on the partial compressed data corresponding to the second page.

9. The printing apparatus according to claim 1,
wherein the controller is configured to execute the second storing processing, the first creating processing, and the first output processing when the partial compressed data for one page has been identified in the first identifying processing,
wherein the controller is configured to execute, when the partial compressed data for one page has not been identified in the first identifying processing:
  a reduced-size-page-data obtaining processing in which the controller reduces a size of the compressed image data while decompressing the compressed image data and obtains reduced-size page data that is size-reduced image data for one page;
  a second creating processing in which the controller creates print data based on the reduced-size page data; and
  a second output processing in which the controller outputs the print data created in the second creating processing,
wherein the controller is configured to repeat the second creating processing and the second output processing the number of times corresponding to the number of pages contained in the compressed image data, and
wherein the printing apparatus is configured to perform printing based on the print data output in one of the first output processing and the second output processing.

10. The printing apparatus according to claim 1,
wherein the controller is configured to execute a data-amount determining processing in which the controller determines whether a data amount of the compressed image data exceeds a second threshold value,
wherein the controller is configured to execute the first storing processing, the first identifying processing, the second storing processing, the first creating processing, and the first output processing when the controller determines that the data amount does not exceed the second threshold value, and
wherein the controller is configured to execute, when the controller determines that the data amount exceeds the second threshold value:
  a reduced-size-page-data obtaining processing in which the controller reduces a size of the compressed image data while decompressing the compressed image data and obtains reduced-size page data that is size-reduced image data for one page;
  a second creating processing in which the controller creates print data based on the reduced-size page data; and
  a second output processing in which the controller outputs the print data created in the second creating processing,
wherein the controller is configured to repeat the second creating processing and the second output processing the number of times corresponding to the number of pages contained in the compressed image data, and
wherein the printing apparatus is configured to perform printing based on the print data output in one of the first output processing and the second output processing.

11. The printing apparatus according to claim 10, wherein the second threshold value is stored in the memory as a condition of execution of the first storing processing, the first identifying processing, the second storing processing, the first creating processing, and the first output processing.

12. The printing apparatus according to claim 1, further comprising a display and a user interface,
wherein the controller is configured to execute:
  a waiting processing in which when the controller determines that the compressed image data is compressed image data for saving printing that requires an input of an output instruction, the controller stores the print data created in the first creating processing into the memory to wait for the output instruction; and
  the first output processing in which when the input of the output instruction is received via the user interface, the controller outputs the print data that is stored in the memory to wait for the output instruction.

13. The printing apparatus according to claim 1,
wherein the controller is configured to execute:
  an end determining processing in which the controller determines whether printing for the print data output in the first output processing is finished; and
  a restart-enabling-input receiving processing in which the controller receives a restart enabling input that enables a restart of the printing, and
wherein the controller is configured to:
  when the controller determines in the end determining processing that printing for one print data output in the first output processing is not finished, keep the one print data in the memory; and
  when the restart enabling input is received, execute the first output processing again.

14. The printing apparatus according to claim 1,
wherein the controller is configured to execute an execution determining processing in which the controller determines, based on a value indicated by the partial compressed data, whether the first creating processing is executable for the partial compressed data,
wherein the controller is configured to execute the first creating processing and the first output processing when the controller determines that the first creating processing is executable for the partial compressed data,
wherein the controller is configured to execute, when the controller determines that the first creating processing is not executable for the partial compressed data:
  a second identifying processing in which the controller identifies a plurality of separate partial compressed data, each as separate partial compressed data, respectively representing a plurality of partial images, each as a partial image, created by dividing an image for one page represented by the partial compressed data;
  a third storing processing in which the controller stores one of the separate partial compressed data and information representing the separate partial compressed data, into the memory;
  a partial-print-data creating processing in which the controller decompresses the separate partial compressed data and creates the print data representing the partial image based on decompressed partial image data obtained by decompressing the separate partial compressed data; and
  a partial-image-data output processing in which the controller outputs the print data representing the partial image, and wherein the controller is configured to repeat the partial-print-data creating processing and the partial-image-data output processing a number of times corresponding to the number of the partial image.

15. The printing apparatus according to claim 1,
wherein the controller comprises:
a computer; and
an application, a reception module, an analysis module, and a job-management module executable by the computer,
wherein the reception module is configured to cause the computer to execute:
the receiving processing in which the computer receives an instruction from the application and receives the compressed image data; and
the first storing processing in which the computer stores the received compressed image data, into a storage area of the memory which is instructed by the application,
wherein the analysis module is configured to cause the computer to execute the first identifying processing in which the computer receives an instruction from the application and identifies the partial compressed data by reading and analyzing the compressed image data stored in the storage area of the memory which is instructed the application,
wherein one of the analysis module and the job-management module is configured to cause the computer to execute the second storing processing in which the computer receives an instruction from the application, divides the compressed image data into the plurality of partial compressed data, and stores the partial compressed data into the storage area of the memory which is instructed the application, and
wherein the job-management module is configured to cause the computer to repeat (i) the first creating processing in which the computer receives an instruction from the application, reads the partial compressed data from the memory, and creates the print data for one page by decompressing the read partial compressed data and (ii) the first output processing a number of times corresponding to the number of pages contained in the compressed image data.

16. A module provided in a controller of a printing apparatus comprising a memory and the controller,
the controller being configured to execute:
a receiving processing in which the controller receives compressed image data that is data created by compressing image data for a plurality of pages;
a first storing processing in which the controller stores the compressed image data into the memory;
an identifying processing in which the controller individually identifies a plurality of partial compressed data corresponding to the plurality of pages in the compressed image data stored in the memory;
a second storing processing in which the controller stores one partial compressed data of the plurality of partial compressed data into the memory or stores information identifying each of the plurality of partial compressed data in the compressed image data, into the memory;
a creating processing in which the controller decompresses the one partial compressed data of the plurality of partial compressed data and creates print data for one page based on decompressed page data that is data for one page obtained by decompressing the one partial compressed data; and
an output processing in which the controller outputs the created print data, the controller being configured to:
repeat the creating processing and the output processing a number of times corresponding to the number of pages contained in the compressed image data; and
execute the identifying processing.

\* \* \* \* \*